United States Patent [19]

Kimura

[11] Patent Number: 5,761,207
[45] Date of Patent: Jun. 2, 1998

[54] MULTIPLEX COMMUNICATION SYSTEM USING VARIABLE MULTIFRAME FORMAT

[75] Inventor: Atsushi Kimura, Tokyo, Japan

[73] Assignee: NEC Corporation, Japan

[21] Appl. No.: 608,417

[22] Filed: Feb. 28, 1996

[30] Foreign Application Priority Data

Feb. 28, 1995 [JP] Japan ................. 7-039633

[51] Int. Cl.$^6$ .................. H04J 3/12; H04J 3/22
[52] U.S. Cl. ...................... 370/524; 370/535
[58] Field of Search .................. 370/250, 251, 370/294, 438, 465, 474, 476, 522, 524, 535, 904, 916

[56] References Cited

U.S. PATENT DOCUMENTS

| | | |
|---|---|---|
| 4,965,787 | 10/1990 | Almond et al. ............ 370/538 |
| 5,005,170 | 4/1991 | Nelson ..................... 370/535 |
| 5,048,012 | 9/1991 | Gulick et al. ............. 370/535 |
| 5,144,625 | 9/1992 | Cain et al. ............... 370/535 |

FOREIGN PATENT DOCUMENTS 56-87954  7/1981  Japan.

*Primary Examiner*—Alpus H. Hsu
*Attorney, Agent, or Firm*—Ostrolenk, Faber, Gerb & Soffen, LLP

[57] ABSTRACT

In a multiplex communication system, D-channel control signals are stored in respective buffers and data quantity of the control signals is detected. The buffers are read according to the detected data quantity and a format control signal is produced corresponding to the detected data quantity. Multiple B-channel information-bearing signals and D-channel control signals read out of the buffers are multiplexed into one of a set of different multiframe formats according to the format control signal, producing therefrom a multiplex signal which is transmitted through a communication channel. At a receive site, the multiplex signal is decomposed according to the format control signal contained therein.

11 Claims, 2 Drawing Sheets

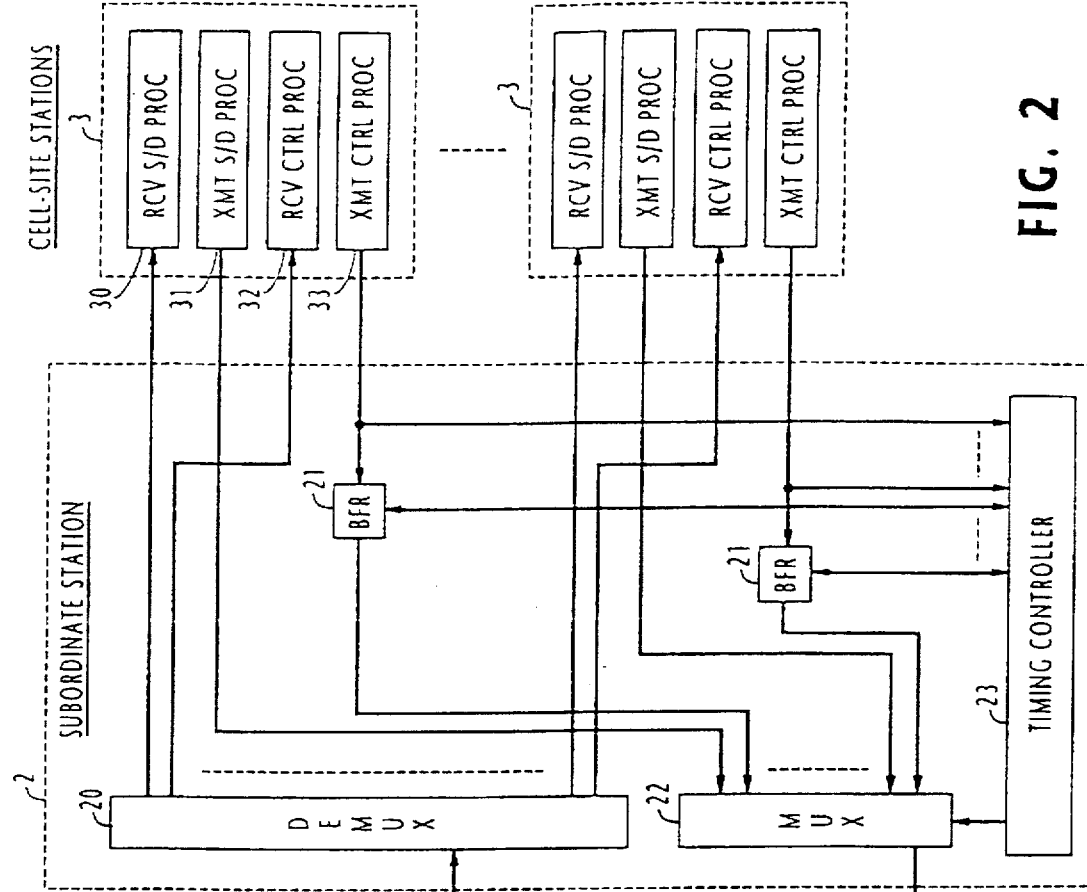
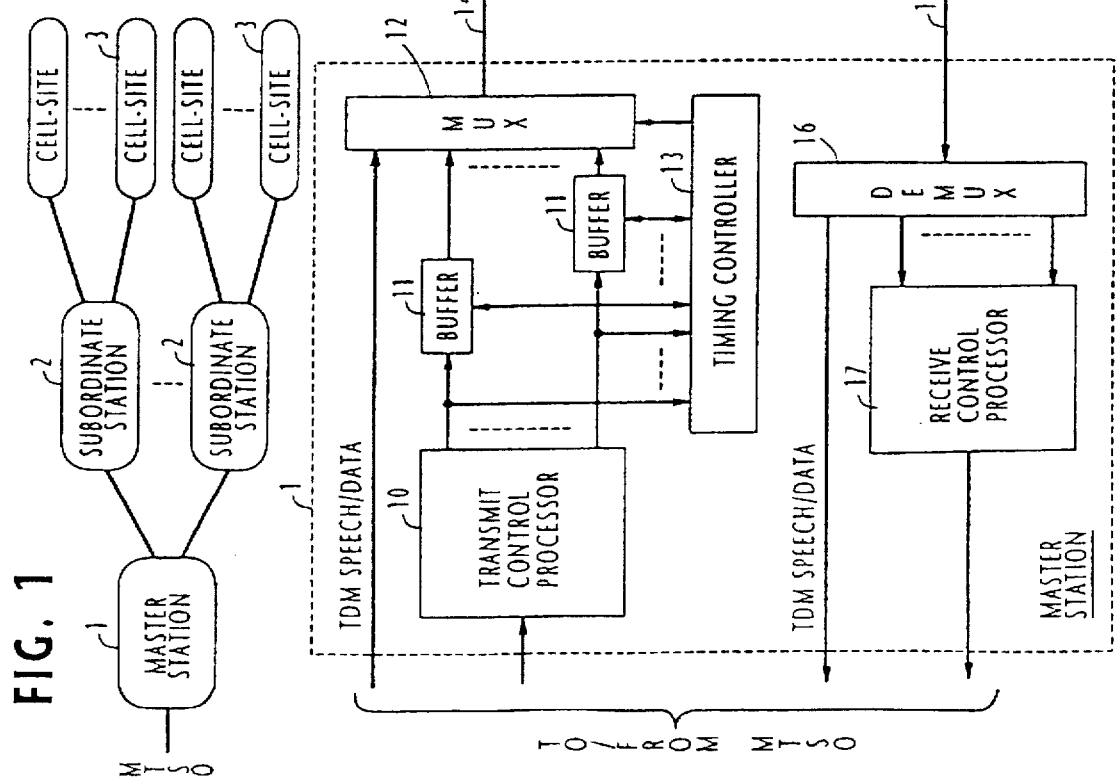
FIG. 1
FIG. 2

FIG. 3A

SPEECH/DATA SLOTS — CONTROL SLOTS — HOUSE-KEEPING

MULTIPLEX COMMUNICATION SYSTEM USING VARIABLE MULTIFRAME FORMAT

BACKGROUND OF THE INVENTION

1. Field of the Invention

The present invention relates generally to multiplex communication systems, and more specifically to a multiplex system particularly useful for networks where there is a significant variation in the control data traffic in comparison with the traffic of information-bearing signals.

2. Description of the Related Art

In a current time-division multiplex communication network, a plurality of stations are hierarchically interconnected between a mobile telephone switching office and various cell-site stations covering microcells for serving cellular mobile telephones. In this network, ISDN basic rate signals (2B+D) can be transmitted on a sequence of multiframes. Since the D-channel has ¼ of the capacity of B-channel, a typical known system combines eight B channels and corresponding four D channels into a single multiframe so that each frame "i" carries B1 to B8 channels and a $D_i$ channel (where i is 1, 2, ... 4).

Another known system, as disclosed in Japanese Provisional Patent Publication Sho-56-87954, employs a multiframe scheme in which B1 to B128 channels and $D_i$, $D_{i+4}$, $D_{i+8}$, ..., $D_{i+60}$ channels are multiplexed into a frame and transmitted in a four-frame sequence.

However, since the known systems use a fixed multiframe format, they are not satisfactory for efficient utilization of channel resources when the control traffic of the network varies significantly not only with a varying number of mobile telephones to be served, but also with a varying amount of control data.

SUMMARY OF THE INVENTION

It is therefore an object of the present invention to provide a multiplex communication system capable of efficient utilization of channel resources.

This object is obtained by the use of variable multiframe formats, one of which is selected for transmission depending on detected control data quantity.

According to a broader aspect of the present invention, there is provided a multiplex communication system comprising a plurality of buffers for respectively storing control signals, means for detecting data quantity of the control signals, controlling the buffers to read out the stored signals according to the detected data quantity and producing a format control signal corresponding to the detected data quantity, a multiplexer for multiplexing a plurality of information-bearing signals and control signals read out of the buffers into one of a set of different multiframe formats according to the format control signal, producing therefrom a multiplex signal, and transmitting the multiplex signal through a communication channel, and a demultiplexer for receiving the multiplex signal through the communication channel and demultiplexing the multiplex signal according to the format control signal contained therein.

According to a specific aspect, the present invention provides a multiplex communication system comprising a first station, a second station and a plurality of third stations. The first station comprises a plurality of buffers for respectively storing forward-channel control signals, a control circuit for detecting data quantity of the forward-channel control signals, controlling the buffers to read out the stored signals according to the detected data quantity and producing a forward-channel format control signal corresponding to the detected data quantity, a multiplexer for multiplexing a plurality of forward-channel information-bearing signals and the forward-channel control signals read out of the buffers into one of a set of different multiframe formats according to the forward-channel format control signal, producing therefrom a forward-channel multiplex signal, and transmitting the forward-channel multiplex signal through a forward transmission channel, and a demultiplexer for demultiplexing a reverse-channel multiplex signal via a reverse transmission channel. The second station comprises a demultiplexer for demultiplexing the forward-channel multiplex signal from the forward transmission channel, a plurality of buffers for respectively storing reverse-channel control signals, a control circuit for detecting data quantity of the reverse-channel control signals, controlling the buffers to read out the stored control signals and producing a reverse-channel format control signal corresponding to the detected data quantity, and a multiplexer for multiplexing a plurality of reverse-channel information-bearing signals and the reverse-channel control signals read out of the buffers into one of a set of different multiframe formats according to the reverse-channel format control signal, producing therefrom a reverse-channel multiplex signal, and transmitting the reverse-channel multiplex signal through the reverse transmission channel. Each of the third stations receives forward-channel information-bearing signals and forward-channel control signals from the demultiplexer of the second station and transmits reverse-channel information-bearing signals to the multiplexer of the second station and transmit reverse-channel control signals to the buffers of the second station.

Preferably, the multiplex signal, in either direction of transmission, comprises a multiframe of first format including a plurality of frames, each frame containing a plurality of time slots for carrying multiplexed information-bearing signals, a plurality of sub-time slots for carrying multiplexed control signals and a time slot for carrying a format control signal indicating the format of the frame, and a multiframe of second format including a plurality of frames of each frame containing a plurality of time slots for carrying multiplexed information-bearing signals and a time slot for carrying a format control signal indicating the format of the frame, one of the frames containing a time slot for carrying a control signal and each of the other frames of the second format multiframe containing a plurality of sub-time slots for carrying multiplexed control signals. The multiplexer produces the first format multiframe when the format control signal indicates that the data quantity is smaller than a predetermined threshold and produces the second format multiframe when the format control signal indicates that the data quantity is greater than the threshold.

BRIEF DESCRIPTION OF THE DRAWINGS

The present invention will be described in further detail with reference to the accompanying drawings, in which:

FIG. 1 shows a simplified network of master and subordinate stations for transmitting information-bearing signals and control signals between a mobile telephone switching office and various cell-site stations;

FIG. 2 shows in block diagram form details of the master station and a subordinate station; and FIGS. 3A and 3B show multiframe formats used by the master and subordinate stations of FIG. 2.

DETAILED DESCRIPTION

In FIG. 1, there is shown a time division multiplex communication network to which the present invention is applied. The network comprises a primary, or master station 1 connected to a mobile telephone switching office (MTSO), not shown, a plurality of secondary, or subordinate stations 2 connected to the master station, and a plurality of terminal, or cell-site stations 3 connected in groups to subordinate stations 2. Information-bearing signals and control signals are transmitted in a multiframe format between the master station and the subordinate stations. As will be described, this multiframe format is varied in accordance with the amount of control data to be transmitted. Each cell-site station 3, or cellular base station, has a small coverage area, called "microcell" to serve personal mobile telephones.

As illustrated in FIG. 2, the master station 1 includes a transmit control processor 10 connected to the MTSO to receive a time-division multiplexed control data, a plurality of buffers 11 connected respectively to the outputs of processor 10, and a time-division multiplexer 12 for multiplexing the control signals from buffers 11 with a time-division multiplexed information-bearing signal from the MTSO. A timing controller 13 is provided to receive the outputs of transmit control processors 10 to determine the amount of control data to be transmitted and controls the buffers 11 to read the stored control signals into the multiplexer 12 according to the detected data quantity. In addition, timing controller 13 produces a format control signal corresponding to the detected data quantity indicating a multiframe format. Each transmit control processor 10 produces many types of control signal as a call progresses, and consequently the amount of control data varies significantly therewith. For example, the amount of control data necessary to establish a call is significantly greater than it is when the call is in progress.

The multiplexer 12 multiplexes control data from buffers 11 with a TDM speech/data signal into a time-division multiframe format specified by the format control signal from controller 13 and transmits the multiplex signal through a forward-channel transmission link 14 to the associated subordinate station 2.

The master station 1 receives a multiplex signal of identical multiframe format through a reverse-channel transmission link 15 from the associated subordinate station 2. This reverse-channel multiplex signal is supplied to a time-division demultiplexer 16 where it is decomposed into a TDM speech/data signal and a plurality of control signals. These control signals are processed by a receive control processor 17 and transmitted to the MTSO in a multiplex format together with the demultiplexed TDM speech/data signal.

The subordinate station 2 includes a demultiplexer 20 where the forward-channel transmission link 14 is terminated. The forward-channel multiplex signal is decomposed into a plurality of pairs of a speech/data signal and a control signal, with the pairs corresponding in number to the cell-site stations 3. Each cell-site station has a receive speech/data processor 30, a transmit speech/data processor 31, a receive control processor 32 and a transmit control processor 33. Each forward-channel speech/data signal and the corresponding forward-channel control signal are transmitted to the receive speech/data processor 30 and receive control processor 32 of a corresponding cell-site station 3, respectively.

A reverse-channel speech/data signal from the transmit speech/data processor 32 is transmitted from the cell-site station to a time-division multiplexer 22 at subordinate station 2 and a corresponding reverse-channel control signal is transmitted to a buffer 21. A timing controller 23 is connected to receive the reverse-channel control signals from all of the associated cell-site stations to determine the amount of control data to be transmitted to the master station in a manner similar to the timing controller 13 at master station 1. Namely, controller 23 controls the buffers 21 to read their stored control signals into the multiplexer 22 according to the detected data quantity and produces a format control signal corresponding thereto. Similar to control processor 10 at master station 1, the transmit control processor 32 of each cell-site station produces many types of control signal as a call progresses, and consequently the amount of control data varies significantly therewith.

The multiplexer 22 provides the multiplexing of reverse-channel control signals from buffers 21 with reverse-channel speech/data signals from cell-site stations into a time-division multiframe format specified by the format control signal from controller 23 and transmits the multiplex signal through the reverse-channel transmission link 15 to the master station 1.

As illustrated in FIGS. 3A and 3B, the signals transmitted on links 14 and 15 are in a variable format of multiframe sequence controlled by timing controller 13 at master station 1 and timing controller 23 at subordinate station 2. In FIG. 3A, a single multiframe comprises a sequence of eight frames $F_1$ to $F_8$ with a total of 66 time slots of equal length. Each time slot has a capacity of carrying 8 kbps information bits. Using the ISDN (2B+D) basic rate, sixty-four B-channel (64-kbps) signals $B_1$ to $B_{64}$ can be transmitted on the 1st to 64th time slots of the eight frames. The 65th time slot of each frame is equally divided into four subslots each with a capacity of carrying 2-kbps control bits. Since D-channel signals are normally transmitted at a rate of 2 kbps in practice, and this rate is 1/32 of the 64-kbps B-channel capacity, 2-kbps D-channel control signals can be transmitted on 32 subslots $D_1$ to $D_{32}$ on eight frames by assigning subslots $D_i$, $D_{i+8}$, $D_{i+16}$, and $D_{i+24}$ to each frame $F_i$ (where the subscript i represents the frame number). The 66th time slot of each frame "i" carries housekeeping data $H_i$ containing the corresponding format signal produced by the timing controller 13 or 23.

When the amount of D-channel control data is small, the multiframe format of FIG. 3A is used at both stations 1 and 2. Specifically, the timing controller 23, for example, determines the amount of cell-site transmitted D-channel signals and produces the format control signal as described above. If controller 23 determines that the volume of the control data is smaller than a predetermined threshold, the format control signal is such that it causes multiplexer 22 to multiplex the 2-kbps D-channel control signals according to the multiframe format of FIG. 3A. If controller 23 determines that the control data volume has exceeded the threshold, it produces a format control signal that causes multiplexer 22 to multiplex the control signals into a multiframe format shown in FIG. 3B.

In FIG. 3B, it is seen that the 65th slot of modified frame $F_1'$ of a given multiframe is exclusively assigned to the control channel $D_1$. Due to this exclusive assignment, D-channel control signals on subslots $D_9$, $D_{16}$ and $D_{25}$ of frame $F_1$ are not transmitted on that multiframe, but transmitted on a subsequent multiframe. If the controller 23 determines that the data volume of channel $D_1$ has exceeded the threshold, it controls those of buffers 21 which are associated with control channels $D_9$, $D_{16}$ and $D_{25}$ to hold their stored signal and controls the buffer associated with the cell-site which transmitted the D1 channel data to supply its output. At the same time, the format control signal produced by controller 23 at this time causes multiplexer 22 to multiplex an 8-kbps $D_1$ channel data into the 65th slot of frame $F_1$ and the format control signal $H_1'$ into the 66th slot, which format control signal indicates that the format of FIG. 3B is being used. Following the transmission of frame $F_1'$, $F_2$, ... $F_8$, controller 23 will determine that the data volume of $D_1$ channel has reduced below the threshold. When this occurs, controller 23 directs the buffers 21 associated with channels $D_9$, $D_{16}$ and $D_{25}$ to supply their stored signals and produces the frame control signal which uses the multiframe format of FIG. 3A. At master station 1, demultiplexer 16 uses the format control signal to decompose its input signal from subordinate station 2.

What is claimed is:

1. A multiplex communication system comprising:

a plurality of buffers for respectively storing control signals which occur either at a higher rate or at a lower rate;

means for detecting data quantity of the control signals, controlling the buffers to read out the stored control signals according to the detected data quantity and producing a format control signal corresponding to the detected data quantity;

a multiplexer for multiplexing a plurality of information-bearing signals and the control signals read out of said buffers into one of a set of different multiframe formats according to the format control signal, producing therefrom a multiplex signal, and transmitting the multiplex signal through a communication channel; and a demultiplexer for receiving the multiplex signal through said communication channel and demultiplexing the multiplex signal according to the format control signal contained therein.

2. A multiplex communication system as claimed in claim 1, wherein the multiplex signal comprises:

a multiframe of first format including a plurality of frames, each frame containing a plurality of time slots for carrying said information-bearing signals, a plurality sub-time slots for carrying lower-rate control signals and a time slot for carrying said format control signal indicating the format of the frame; and a multiframe of second format including a plurality of frames each frame containing a plurality of time slots for carrying said information-bearing signals and a time slot for carrying said format control signal indicating the format of the frame, one of the frames containing a time slot for carrying the higher-rate control signal and each of the other frames of the second format multiframe containing a plurality of sub-time slots for carrying the lower-rate control signals, said multiplexer producing the first format multiframe when the format control signal of the first format multiframe indicates that said data quantity is smaller than a predetermined threshold and producing the second format multiframe when the format control signal of the second format multiframe indicates that said data quantity is greater than the predetermined threshold.

3. A multiplex communication system as claimed in claim 1, wherein said information-bearing signals are integrated services digital network ("ISDN") B-channel signals, and the higher-rate and lower-rate control signals are ISDN D-channel control signals.

4. A multiplex communication system comprising:

a first station comprising:

a plurality of buffers for respectively storing forward-channel control signals which occur either at a higher rate or at a lower rate;

control means for detecting data quantity of the forward-channel control signals, controlling the buffers to read out the stored signals according to the detected data quantity and producing a forward-channel format control signal corresponding to the detected data quantity;

a multiplexer for multiplexing a plurality of forward-channel information-bearing signals and the forward-channel control signals read out of said buffers into one of a set of different multiframe formats according to the forward-channel format control signal, producing therefrom a forward-channel multiplex signal, and transmitting the forward-channel multiplex signal through a forward transmission channel; and a demultiplexer for demultiplexing a reverse-channel multiplex signal via a reverse transmission channel;

a second station comprising:

a demultiplexer for demultiplexing the forward-channel multiplex signal from the forward transmission channel into the plurality of forward-channel information-bearing signals and the forward-channel control signals;

a plurality of buffers for respectively storing reverse-channel control signals;

control means for detecting data quantity of the reverse-channel control signals, controlling the buffers to read out the stored control signals and producing a reverse-channel format control signal corresponding to the detected data quantity; and a multiplexer for multiplexing a plurality of reverse-channel information-bearing signals and the reverse-channel control signals read out of said buffers into one of a set of different multiframe formats according to said reverse-channel format control signal, producing therefrom a reverse-channel multiplex signal, and transmitting the reverse-channel multiplex signal through the reverse transmission channel; and a plurality of third stations for respectively receiving the forward-channel information-bearing signals and the forward-channel control signals from the demultiplexer of the second station and respectively transmitting reverse-channel information-bearing signals to the multiplexer of the second station and respectively transmitting reverse-channel control signals to the buffers of the second station.

5. A multiplex communication system as claimed in claim 4, wherein each of the forward- and reverse-channel multiplex signals comprises:

a multiframe of first format including a plurality of frames, each frame containing a plurality of time slots for carrying the information-bearing signals, a plurality of sub-time slots for carrying the lower-rate control signals and a time slot for carrying a format control signal indicating the format of the frame; and a multiframe of second format including a plurality of frames of each frame containing a plurality of time slots for carrying the information-bearing signals and a time slot for carrying a format control signal indicating the format of the frame, one of the frames containing a time slot for carrying the higher-rate control signal and each of the other frames of the second format multiframe containing a plurality of sub-time slots for carrying the lower-rate control signals, said multiplexer producing the first format multiframe when the format control signal thereof indicates that said data quantity is smaller than a predetermined threshold and producing the second format multiframe when the format control signal thereof indicates that said data quantity is greater than the predetermined threshold.

6. A multiplex communication system as claimed in claim 4, wherein said information-bearing signals are integrated services digital network ("ISDN") B-channel signals, and the higher- and lower-rate control signals are ISDN D-channel control signals.

7. A multiplex communication system as claimed in claim 4, wherein said third stations are cell-site stations serving cellular mobile telephones and said first station is connected to a mobile telephone switching office.

8. A method of communication comprising the steps of:

a) storing control signals into respective buffers;

b) detecting data quantity of the control signals which occur either at a higher rate or at a lower rate;

c) reading the stored control signals from the buffers according to the detected data quantity;

d) multiplexing a plurality of information-bearing signals and the control signals read out of said buffers into one of a set of different multiframe formats according to the detected data quantity and a format control signal corresponding to said detected data quantity, and producing therefrom a multiplex signal;

e) transmitting the multiplex signal through a communication channel; and f) receiving the multiplex signal through said communication channel and demultiplexing the multiplex signal according to the format control signal contained therein.

9. A method as claimed in claim 8, wherein the multiplex signal comprises:

a multiframe of first format including a plurality of frames, each frame containing a plurality of time slots for carrying said information-bearing signals, a plurality of sub-time slots for carrying the lower-rate control signals and a time slot for carrying a format control signal indicating the format of the frame; and a multiframe of second format including a plurality of frames, each frame containing a plurality of time slots for carrying said information-bearing signals and a time slot for carrying a format control signal indicating the format of the frame, one of the frames containing a time slot for carrying the higher rate control signal and each of the other frames of the second format multiframe containing a plurality of sub-time slots for carrying the lower-rate control signals, wherein the step (d) produces the first format when the format control signal thereof indicates that said data quantity is smaller than a predetermined threshold and producing the second format multiframe when the format control signal thereof indicates that said data quantity is greater than the predetermined threshold.

10. A multiplex communication system comprising:

a plurality of buffers for respectively storing control signals which occur either at a higher rate or at a lower rate;

a controller detecting data quantity of the control signals, controlling the buffers to read out the stored control signals according to the detected data quantity and producing a format control signal corresponding to the detected data quantity;

a multiplexer for multiplexing a plurality of information-bearing signals and the control signals read out of said buffers into one of a set of different multiframe formats according to the format control signal, producing therefrom a multiplex signal, and transmitting the multiplex signal through a communication channel; and a demultiplexer for receiving the multiplex signal through said communication channel and demultiplexing the multiplex signal according to the format control signal contained therein.

11. A multiplex communication system comprising:

a first station comprising:

a plurality of buffers for respectively storing forward-channel control signals which occur either at a higher rate or at a lower rate;

a controller for detecting data quantity of the forward-channel control signals, controlling the buffers to read out the stored signals according to the detected data quantity and producing a forward-channel format control signal corresponding to the detected data quantity;

a multiplexer for multiplexing a plurality of forward-channel information-bearing signals and the forward-channel control signals read out of said buffers into one of a set of different multiframe formats according to the forward-channel format control signal, producing therefrom a forward-channel multiplex signal, and transmitting the forward-channel multiplex signal through a forward transmission channel; and a demultiplexer for demultiplexing a reverse-channel multiplex signal via a reverse transmission channel;

a second station comprising:

a demultiplexer for demultiplexing the forward-channel multiplex signal from the forward transmission channel into the plurality of forward-channel information-bearing signals and the forward-channel control signals;

a plurality of buffers for respectively storing reverse-channel control signals;

a controller for detecting data quantity of the reverse-channel control signals, controlling the buffers to read out the stored control signals and producing a reverse-channel format control signal corresponding to the detected data quantity; and a multiplexer for multiplexing a plurality of reverse-channel information-bearing signals and the reverse-channel control signals read out of said buffers into one of a set of different multiframe formats according to said reverse-channel format control signal, producing therefrom a reverse-channel multiplex signal, and transmitting the reverse-channel multiplex signal through the reverse transmission channel; and a plurality of third stations for respectively receiving the forward-channel information-bearing signals and the forward-channel control signals from the demultiplexer of the second station and respectively transmitting reverse-channel information-bearing signals to the multiplexer of the second station and respectively transmitting reverse-channel control signals to the buffers of the second station.

* * * * *